(12) United States Patent
Minato et al.

(10) Patent No.: US 7,075,200 B2
(45) Date of Patent: Jul. 11, 2006

(54) DIRECT-DRIVEN MAGNETIC ROTATING APPARATUS

(76) Inventors: Kohei Minato, No. 901, 28-20, Yotsuya 4-Chome, Shinjuku-Ku, Tokyo 106-0004 (JP); Nobue Minato, No. 901, 28-20, Yotsuya 4-Chome, Shinjuku-ku, Tokyo 106-0004 (JP)

( * ) Notice: Subject to any disclaimer, the term of this patent is extended or adjusted under 35 U.S.C. 154(b) by 0 days.

(21) Appl. No.: 10/927,294

(22) Filed: Aug. 25, 2004

(65) Prior Publication Data

US 2005/0046285 A1    Mar. 3, 2005

(30) Foreign Application Priority Data

Aug. 26, 2003    (JP) ............................. 2003-208744

(51) Int. Cl.
*H02K 9/00*    (2006.01)
*H02K 9/06*    (2006.01)

(52) U.S. Cl. .............................. 310/67 R; 310/156.38; 310/181

(58) Field of Classification Search .............. 310/67 R, 310/103, 156.43, 156.44, 156.45, 156.47, 310/156.48, 156.49, 156.53, 254, 181
See application file for complete search history.

(56) References Cited

U.S. PATENT DOCUMENTS

| | | | |
|---|---|---|---|
| 3,333,346 A | * | 8/1967 | Brucken ....................... 34/131 |
| 3,962,593 A | | 6/1976 | Bowen et al. ................. 310/46 |
| 4,067,139 A | * | 1/1978 | Pinkerton et al. .............. 446/31 |
| 4,642,534 A | | 2/1987 | Mitchell et al. ............. 318/138 |
| 5,233,251 A | * | 8/1993 | Nehmer ....................... 310/167 |
| 5,594,289 A | | 1/1997 | Minato ........................ 310/152 |
| 6,703,743 B1 | * | 3/2004 | Kaneko et al. ......... 310/156.38 |
| 2004/0212259 A1 | * | 10/2004 | Gould ....................... 310/67 R |

FOREIGN PATENT DOCUMENTS

| | | |
|---|---|---|
| EP | 0 647 009 A | 4/1995 |
| JP | 07-87725 | 3/1995 |
| JP | 09 233872 A | 9/1997 |
| JP | 09 285103 A | 10/1997 |
| JP | 2968918 | 8/1999 |
| WO | 94/01924 A | 1/1994 |

OTHER PUBLICATIONS

Patent Abstracts of Japan vol. 1998, No. 01, Jan. 30, 1998 -& JP 09 233872 A (Minato, Kohei), Sep. 5, 1997.
Patent Abstracts of Japan vol. 1998, No. 02, Jan. 30, 1998-& JP 09 285103 A (Minato, Kohei), Oct. 31, 1997.

* cited by examiner

*Primary Examiner*—Darren Schuberg
*Assistant Examiner*—David W. Scheuermann
(74) *Attorney, Agent, or Firm*—Ladas & Parry LLP

(57) ABSTRACT

Rotating-force transmission means is omitted by mounting permanent magnet plates directly to a rotational body which is rotated by magnetic repulsive force, thereby achieving a high-efficiency compact low-cost direct-driven magnetic rotating apparatus.

4 Claims, 7 Drawing Sheets

Prior Art

DIRECT-DRIVEN MAGNETIC ROTATING APPARATUS

BACKGROUND OF THE INVENTION

1. Field of the Invention

The present invention relates to a magnetic rotating apparatus for directly rotating a fan etc. and, more particularly, to a direct-driven magnetic rotating apparatus using the repulsive force between a permanent magnet and an electromagnet or a permanent magnet.

2. Description of the Related Art

It is known in the art to provide various rotating apparatuses using magnetic force and, particularly, permanent magnet motors are typical applications. Magnetic force has attractive force and repulsive force. Most of the application apparatuses use attractive force. However, it is more preferable to use repulsive force in force in view of efficiency and high-speed rotation. The inventor has therefore disclosed an application apparatus using repulsive force in Japanese Patent No. 2,968,918 (Patent Document 1) and JP-A-7-87725 (Patent Document 2).

The invention disclosed in Patent Document 1 will now be described with reference to FIG. 1 and FIG. 2. FIG. 1 is a general view of a magnetic rotating apparatus. FIG. 2 is a diagram illustrating the relationship between the repulsive force and rotation of magnets which are essential parts of the magnetic rotating apparatus. Referring to FIG. 1, a plurality of permanent magnet plates 103a to 103h is mounted to a rotational body 102 fixed to a rotational shaft 101. Electromagnets 104 are provided in the vicinity of the rotational body having the permanent magnet plates. The part of the rotational body having no permanent magnet plate is provided with balancers 105 (105a to 105h) for balancing the rotation.

Referring to FIG. 2, the principle that the rotational body 102 of the magnetic rotating apparatus having such a structure rotates using magnetically repulsive force will be described. The permanent magnet plates 103a to 103h are disposed diagonally relative to the electromagnets 104, or at an angle D relative to the straight line connecting the electromagnet 104 and the rotational shaft 101 so that permanent magnet plates mounted to the rotational body 102 generate repulsive force to the electromagnets 104 disposed in the vicinity thereof and the repulsive force causes torque.

In the magnetic rotating apparatus with such a structure, energization of the electromagnets 104 to rotate the rotational body 102 is controlled as follows: A pulsed current is applied to the electromagnets 104 to generate magnetic force, thereby generating repulsive force between them and the permanent magnet plates 103a to 103h to generate torque due to a vector component of a rotating direction which is part of the repulsive force, thus rotating the rotational body 102. The application of the pulsed current is started when the first permanent magnet plate 103h comes close to the electromagnet 104 and stopped when the last permanent magnet plate 103a separates from the electromagnet 104. During the period the permanent magnet plates 103a to 103h are not present in the vicinity of the electromagnet 104, the electromagnet 104 is not energized but the rotational body 102 rotates by inertia.

An application apparatus incorporating the magnetic rotating apparatus is disclosed in Patent Document 2. The document refers to a motor and a generator constructed of the magnetic rotating apparatus as application apparatus. When the magnetic rotating apparatus is used as motor, other objects, e.g. bus tires are rotated using the shaft of the motor.

The application apparatus using the magnetic rotating apparatus transmits torque using a shaft etc. in the process of transmitting the torque of the magnetic rotating apparatus to a target. This produces the problem of decreasing the transmission efficiency of the torque because of the shaft and the problem of increasing the cost of components including the shaft and upsizing the entire apparatus.

Furthermore, in order to obtain larger torque or higher rotation speed, power consumption of the electromagnet will be increased or the number or size of permanent magnet plates must be increased to have stronger electromagnetic force, posing the problem of increasing cost and size of the apparatus.

SUMMARY OF THE INVENTION

The present invention has been made in view of the above problems. Accordingly, it is an object of the present invention to provide a direct-driven magnetic rotating apparatus suitable for decreasing the cost and size of the apparatus in which the torque transmission efficiency of a magnetic rotating apparatus is increased remarkably to generate higher torque without increasing power consumption and upsizing the apparatus.

The present invention relates to a direct-driven magnetic rotating apparatus that rotates a rotational body using magnetic repulsive force. The foregoing object can be achieved by including a rotatable rotational shaft; a rotational body including a permanent magnet disposed radially outwards at a prescribed angle around the rim of the outer periphery and fixed to the rotational shaft; and an electromagnet disposed in the vicinity of the outer periphery rim of the rotational body so as to be periodically opposed to the permanent magnet in the vicinity thereof, wherein the permanent magnet is energized by the repulsive force of the electromagnet. The above object of the invention can be achieved more effectively by the permanent magnet including a plurality of permanent magnet plates. The above object can be achieved more effectively by the permanent magnet including a plurality of permanent magnet plates, wherein a permanent magnet plate having the largest magnetic force of the plurality of permanent magnet plates is arranged in the last position with respect to the rotating direction. The above object can be achieved more effectively by setting the numbers of the permanent magnets and the electromagnets plural and equal. The above object can be achieved more effectively by setting the number of the electromagnets two, and by joining ends of opposite polarities of the electromagnets together with a permeable body. The above object can be achieved more effectively by the rotational body including a propeller. The above object can be achieved more effectively by the rotational body including a drum of a washing machine or a dryer machine. The above object can be achieved more effectively by the rotational body including a wheel of an automobile.

DETAILED DESCRIPTION OF THE PREFERRED EMBODIMENTS

Preferred Embodiments of the present invention will be specifically described hereinbelow with reference to the drawings.

Figure 3:
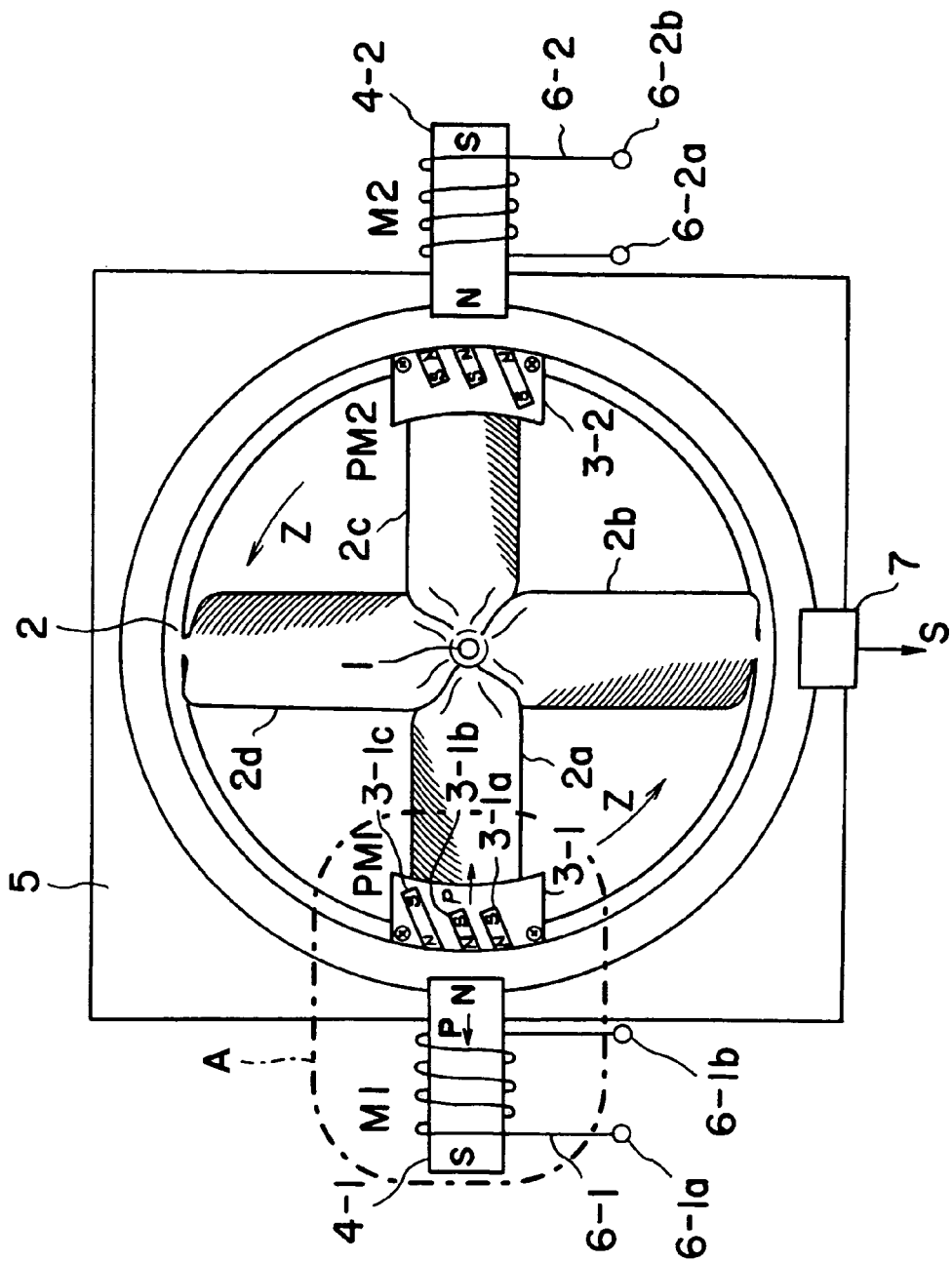
FIG. 3 is a structural diagram of a direct-driven magnetic rotating apparatus according to the present invention, which is applied to a fan (air blower).
Figure 4:
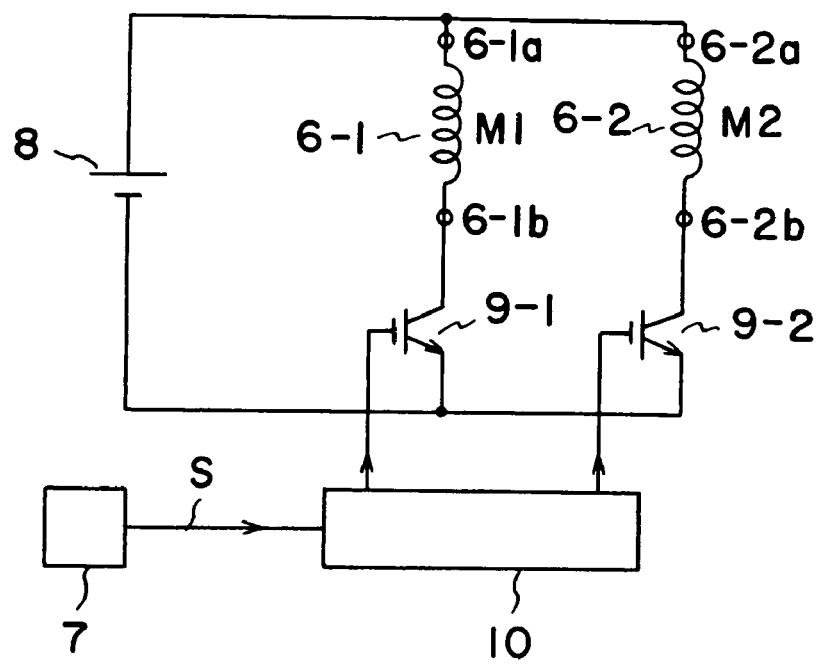
FIG. 4 is a circuit diagram of an electromagnet control circuit which is a component of the direct-driven magnetic rotating apparatus of the present invention.
Figure 5:
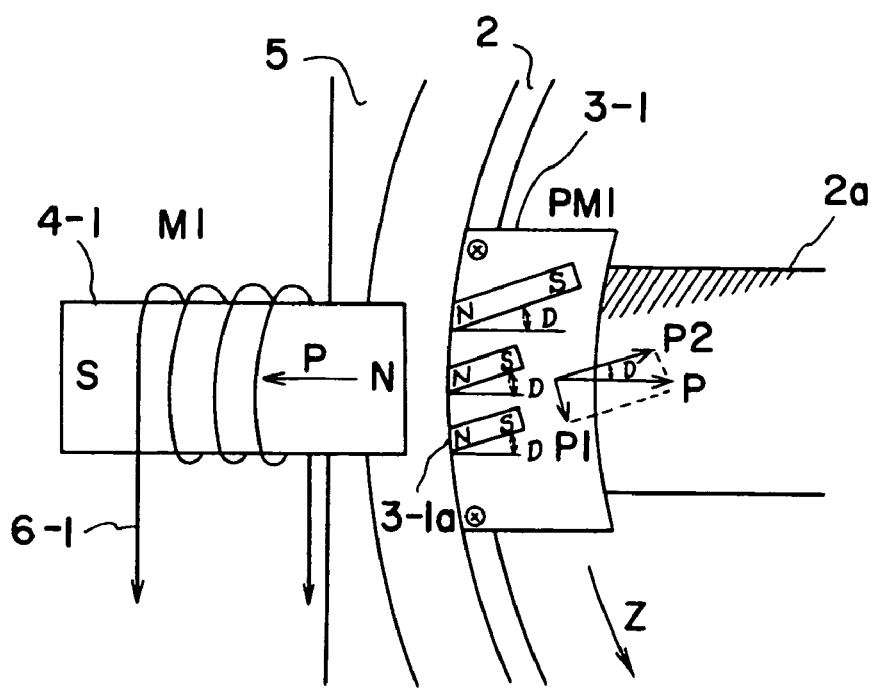
FIG. 5 is a diagram of the arrangement of permanent magnet plates of a permanent magnet of the direct-driven magnetic rotating apparatus.

An embodiment in which a magnetic rotating apparatus according to an embodiment of the invention is applied to a fan or an air blower will first be described. FIG. 3 shows the structure of a fan incorporating the magnetic rotating apparatus. FIG. 4 shows an electromagnet control circuit for the electromagnet of the fan. FIG. 5 is an enlarged view of the part corresponding to part A of FIG. 3, illustrating the principle of high-torque generation of the magnetic rotating apparatus.

Referring to FIG. 3, a rotatable ring-shaped rotational body 2 is mounted to a rotational shaft 1 retained by a frame 5. The rotational body 2 includes a propeller. The propeller of this embodiment has four blades 2a, 2b, 2c, and 2d. At the rim of the outer periphery of the rotational body 2, permanent magnets 3-1 and 3-2 are mounted with an inclination of a prescribed angle D. The permanent magnets 3-1 and 3-2 include a plurality of (three in this embodiment) permanent magnet plates 3-1a, 3-1b, and 3-1c and 3-2a, 3-2b, and 3-2c, respectively. Supposing that the rotational body 2 rotates in the direction of arrow Z, the permanent magnets 3-1 and 3-2 are arranged in order of 3-1a, 3-1b, and 3-1c and 3-2a, 3-2b, and 3-2c, respectively, as viewed from the same direction as the rotating direction. Although the permanent magnets 3-1 and 3-2 of this embodiment are provided at the rims of the outer periphery of the blades 2a and 2c, respectively, they may be provided at the blades 2b and 2d.

The permanent magnet plates 3-1c and 3-2c have larger magnetic force than the permanent magnet plates 3-1a and 3-1b, and 3-2a and 3-2b. Therefore, the permanent magnet 3-1 has the permanent magnet plate 3-1c having the largest magnetic force at the last when viewed from the rotating direction, while the permanent magnet 3-2 has the permanent magnet plate 3-2c having the highest magnetic force at the last when viewed from the rotating direction.

In order to make magnetic force stronger than that of the other permanent magnet plates, for the same kind of magnetic material, increasing the volume can enhance the magnetic force; even for equal or smaller volume of magnetic plates, using a magnetic material having a stronger magnetic force per volume can increase magnetic force. In this embodiment, using the same magnetic material for all the permanent magnet plates and setting the volume of the permanent magnet plates 3-1c and 3-2c larger than that of the permanent magnet plates 3-1a, 3-1b, 3-2a, and 3-2b, thus enhancing the magnetic force.

Opposing electromagnets 4-1 and 4-2 are mounted to the frame 5 such that they are arranged in the vicinity of the rotational body 2 and, when the rotational body 2 rotates, they are periodically opposed in the vicinity. Around the electromagnets 4-1 and 4-2, electric wires 6-1 and 6-2 for magnetizing them are wound, respectively, so as to apply pulsed current to the electric wires 6-1 and 6-2 from an electromagnet control circuit of FIG. 4, to be described later, so that the rotational body 2 rotates in cooperation with the permanent magnets 3-1 and 3-2.

A position sensor 7 for measuring the rotating position of the rotational body 2 without contact is mounted to the frame 5. The position sensor 7 senses the position of the permanent magnet 3-1 or 3-2 relative to the electromagnet 4-1 or 4-2 during the rotation of the rotational body 2. Its position signal determines the timing of the generation and the stop of pulsed current applied to the electromagnets 4-1 and 4-2. In other words, the pulsed current applied to the electromagnets 4-1 and 4-2 is controlled by the signal from the position sensor 7 such that application of the pulsed current is started when the permanent magnets 3-1 and 3-2 mounted to the rotating blades 2a and 2c enter the position of the electromagnets 4-1 and 4-2, respectively, and stopped when the permanent magnets 3-1 and 3-2 separates from the electromagnets 4-1 and 4-2, respectively. The position sensor 7 may be a combination of a light-emitting diode and a phototransistor or a photocoupler or, alternatively, may be a hall sensor.

FIG. 4 shows an electromagnet control circuit for applying pulsed current to the electromagnets 4-1 and 4-2 in synchronization with the rotational body 2. The structure is as follows: Electric wires 6-1 and 6-2 connect from a direct-current source 8 through transistor switches 9-1 and 9-2 to the electromagnets 4-1 and 4-2, respectively. The bases of the transistor switches 9-1 and 9-2 are controlled by a base-signal generation circuit 10 which generates the following signal in synchronization with a signal S of the position sensor 7.

Specifically speaking, the base-signal generation circuit 10 generates base signals according to the signal S, that turn on the transistor switches 9-1 and 9-2 when the permanent magnets 3-1 and 3-2 come close to the electromagnets 4-1 and 4-2, respectively, and that turn off the transistor switches 9-1 and 9-2 when the permanent magnets 3-1 and 3-2 separates from the electromagnets 4-1 and 4-2, respectively. As a result, pulsed current is applied to the electromagnets 4-1 and 4-2, respectively, to rotate the rotational body 2 by turning torque generated by the repulsive force between the electromagnet 4-1 and the permanent magnet 3-1 and the repulsive force between the electromagnet 4-2 and the permanent magnet 3-2.

When the rotational body 2 rotates 180 degrees, then the base-signal generation circuit 10 generates base signals that turn on the transistor switches 9-1 and 9-2 when the permanent magnets 3-1 and 3-2 come close to the electromagnets 4-2 and 4-1, respectively, and that turn off the transistor switches 9-1 and 9-2 when the permanent magnets 3-1 and 3-2 separates from the electromagnets 4-2 and 4-1, respectively.

The operation of the magnetic rotating apparatus with such a structure will now be described. When the transistors 9-1 and 9-2 are turned on, the application of pulsed current from the direct-current source 8 to the electric wire 6-1 of the electromagnet 4-1 and the electric wire 6-2 of the electromagnet 4-2 is started to generate a repulsive force P between the electromagnet 4-1 and the permanent magnet 3-1 and between the electromagnet 4-2 and the permanent magnet 3-2 and as such, a rotation moment generates in the direction of Z. With the rotation in the Z-direction, when the last permanent magnet plate 3-1C of the permanent magnet 3-1 passes through the position opposed to the electromagnet 4-1 or the last permanent magnet plate 3-2C of the permanent magnet 3-2 passes through the position opposed to the electromagnet 4-2, the transistors 9-1 and 9-2 are turned off to stop the pulsed current. The timing of turning-on or -off can be detected by sensing the position with the above-described position sensor 7, an so the base-signal generation circuit 10 generates the respective base signals of the transistors 9-1 and 9-2 in accordance with the signal S from the position sensor 7.

After the transistors 9-1 and 9-2 have been turned off, no current is applied to the electromagnets 4-1 and 4-2 and as such, the rotational body 2 continues the rotation by inertia. When the first permanent magnet plate 3-1a of the permanent magnet 3-1 comes to the position opposed to the electromagnet 4-2, or when the first permanent magnet plate 3-2a of the permanent magnet 3-2 comes to the position opposed to the electromagnet 4-1, the position is also detected by the position sensor 7 and the detection signal S generated from the position sensor 7 is sent to the base-signal generation circuit 10.

The transistors 9-1 and 9-2 are turned on again in accordance with base signals generated from the base-signal generation circuit 10 according to the detection signal S. By the turning-on, pulsed current is applied to the electromagnets 4-1 and 4-2 to generate repulsive force between the electromagnet 4-1 and the permanent magnet 3-2 and between the electromagnet 4-2 and the permanent magnet 3-1, respectively, thereby accelerating the rotation of the rotational body 2 using part of the repulsive force as rotating force.

When the permanent magnet plate 3-1C comes to the position opposed to the electromagnet 4-2 and the permanent magnet plate 3-2C comes to the position opposed to the electromagnet 4-1 by the rotation, the transistors 9-1 and 9-2 are turned off in accordance with the base signals generated from the base-signal generation circuit 10 according to the position detection signal S. By the turning-off, the application of the pulsed current to the electromagnets 4-1 and 4-2 is stopped but the rotation of the rotational body 2 accelerated by the pulsed current continues by inertia.

As described above, as application of pulsed current to the electromagnets 4-1 and 4-2 is repeated, the rotation of the rotational body 2 is accelerated. As the rotational body 2 rotates, the propeller suitable for air blow, such as the blades 2a, 2b, 2c, and 2d, also rotates together to blow air. As such, the rotational body 2 operates as a fan or an air blower. As described above, the electromagnets are supplied with pulsed current only when the permanent magnet comes to the opposing position, thus offering the advantage of saving electricity.

Figure 1:
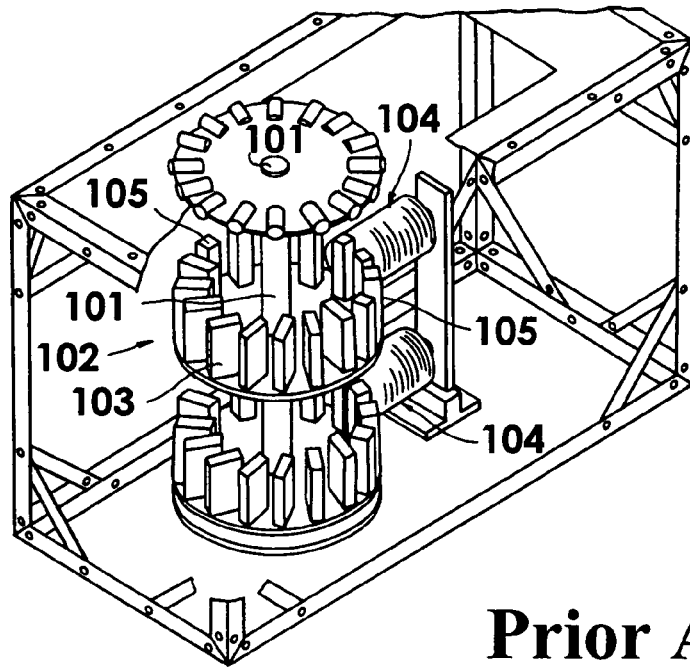
FIG. 1 is a structural diagram of a conventional magnetic rotating apparatus.
Figure 2:
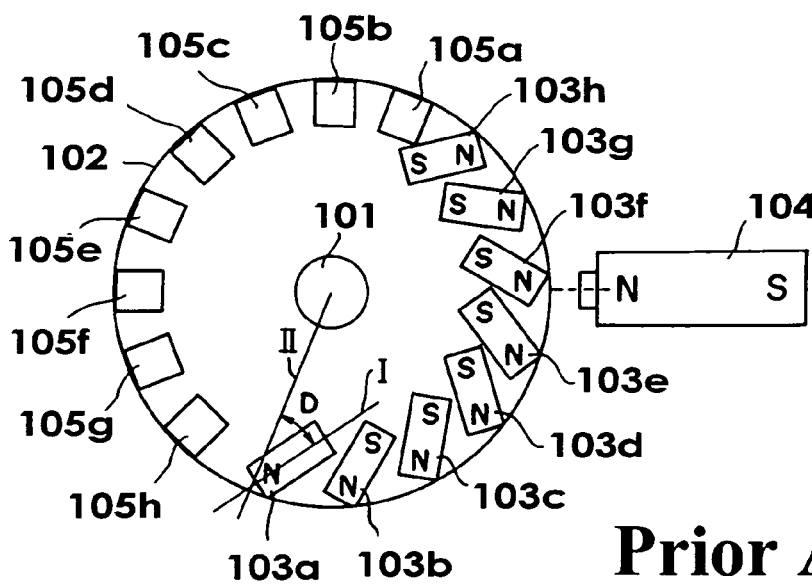
FIG. 2 is a diagram of an application apparatus incorporating the conventional magnetic rotating apparatus.

Referring to FIG. 5, the details of the present invention to obtain a larger turning torque without consuming much electricity as compared with the conventional magnetic rotating apparatus, shown in FIG. 1, will be described hereinafter. FIG. 5 is an enlarged view of part A in FIG. 3, showing the principle for obtaining high turning torque. The permanent magnet 3-1 includes a plurality of the permanent magnet plates 3-1a, 3-1b, and 3-1c. Supposing that the rotational body 2 rotates in the direction of Z, the permanent magnet plate 3-1c having the largest magnetic force is arranged at the last in the rotating direction. By arranging the permanent magnet plates 3-1a, 3-1b, and 3-1c radially outwards at a prescribed angle D so that the repulsive force P between the electromagnet 4-1 and the permanent magnet 3-1 generates a rotation moment in the rotating direction, the repulsive force P can be broken down to a vector P1 in the rotating direction and a vector P2 perpendicular to that, or at angle D with respect to the radial direction.

Since the rotating force is generated by the repulsive force between the permanent magnet 3-1 and the electromagnet 4-1, the larger the repulsive force of the last part of the permanent magnet is, the larger turning torque is obtained. Accordingly, when a permanent magnet plate having the largest magnetic force is arranged in the last position with respect to the rotating direction, the rotation can be continued using the maximum turning torque generated by the maximum repulsive force and inertial force. Thus, it is when the permanent magnet plate 3-1C having the largest magnetic force is opposed to the electromagnet 4-1 that the rotation moment of P1 becomes the maximum.

The structure in which the permanent magnet plate having the largest magnetic force is arranged at the last position offers the advantage of reducing the size of the apparatus and also the cost for the permanent magnet plates because electricity to the electromagnet is not increased and only the volume of the last permanent magnet plate is increased a little.

Returning to FIG. 3, as the rotational body 2 rotates, the propeller-shaped blades 2a to 2d which are part of the rotational body 2 also rotates together. Air-blowing starts by the rotating blade 2 and as such, the rotational body 2 serves as a fan or an air blower. Since general fans or air blowers have motors and propeller blades separated from each other, motor shafts and the blades are joined together with shafts etc. However, the rotating force cannot be transmitted from the motor to the blades without loss, inevitably reducing efficiency.

On the other hand, with the fan or air blower constructed of the direct-driven magnetic rotating apparatus according to the invention, a propeller constructs a rotational body, thus offering the advantage of losing no rotating force generated in the joint portion to bring high efficiency. Also, since a joining component such as a shaft is not used, there is the advantage of achieving a compact and low-cost fan or air blower.

In other words, the use of the direct-driven magnetic rotating apparatus according to the invention offers the advantages of achieving a high-torque magnetic rotating apparatus by the action of the repulsive force of the permanent magnet plate having the largest magnetic force arranged at the last of the permanent magnet without increasing power consumption for the electromagnets and without using many permanent magnet plates, and providing a compact and low-cost application apparatus incorporating the magnetic rotating apparatus, such as a fan, capable of obtaining high-efficiency rotating force because there is no need for components for transmitting rotating force, such as a shaft.

An embodiment including two permanent magnets and two electromagnets at 180-degree opposed positions has been described with reference to FIG. 3. However, also a direct-driven magnetic rotating apparatus including three permanent magnets and three electromagnets arranged in the positions 120 degrees apart from one another, or alternatively, including more magnets can similarly provide high-torque rotating force due to the repulsive force of the last permanent magnet plate, and provide compact and low-cost application apparatus incorporating the magnetic rotating apparatus capable of obtaining high-efficiency rotating force because there is no need for components for transmitting rotating force.

It is also principally possible for the direct-driven magnetic rotating apparatus of the invention to achieve a structure in which the transmission efficiency of the rotating force is increased even when the permanent magnet includes one permanent magnet plate and so it has only one permanent magnet and one electromagnet each.

Its embodiment will be described with reference to FIG. 6. The permanent magnet 3-1 includes only one permanent magnet plate 3-1a, so that the apparatus has one permanent magnet 3-1 and one electromagnet 4-1 each. This structure needs repulsive force between the permanent magnet 3-1 and the electromagnet 4-1 that causes at least one rotation. However, a direct-driven magnetic rotating apparatus with such a structure causes one rotation by one-time repulsive force, thus significantly decreasing in torque in the last state of one rotation. Therefore, this structure is not suited to generate large torque as compared with a structure including a plurality of permanent magnets and electromagnets but suitable for a relatively simple structure which requires no large torque, such as a fan.

Figure 6:
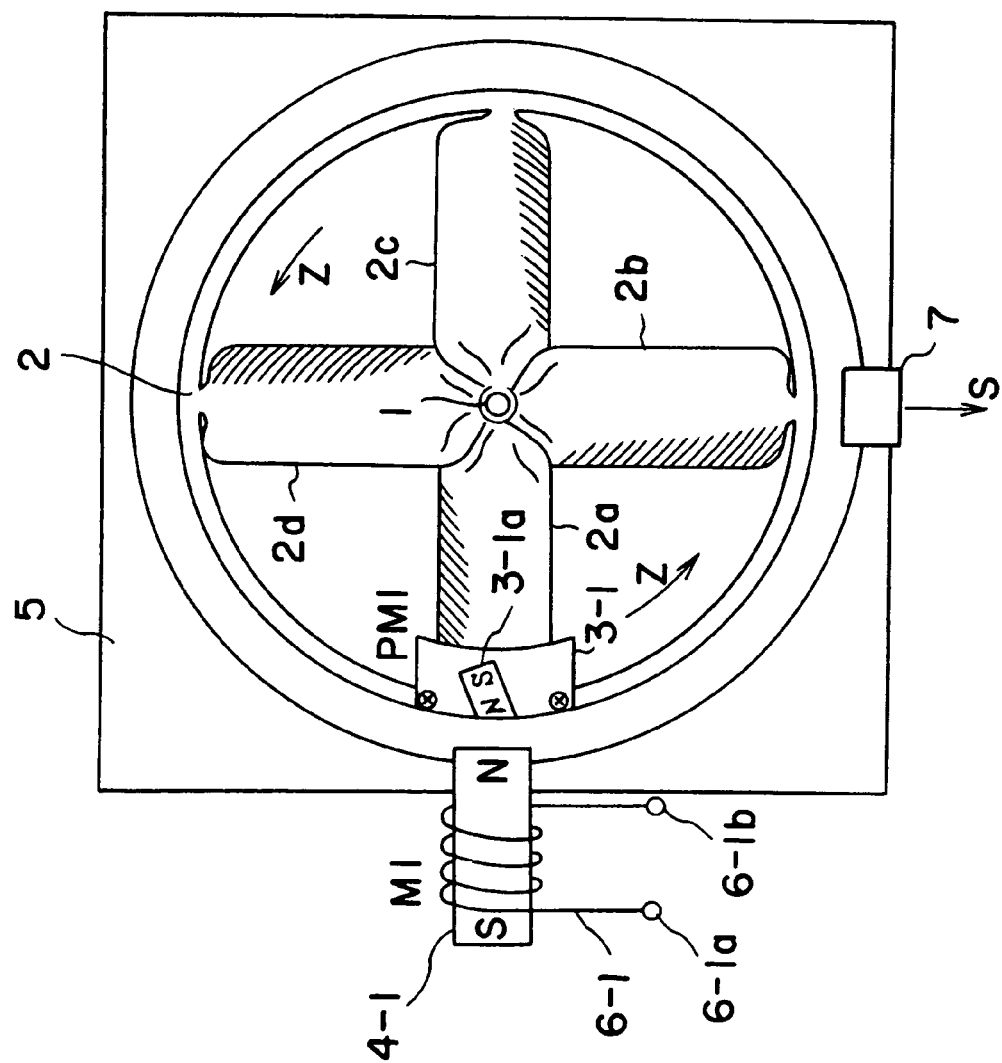
FIG. 6 is a structural diagram of a direct-driven magnetic rotating apparatus including one permanent magnet and an electromagnet each.
Figure 7:
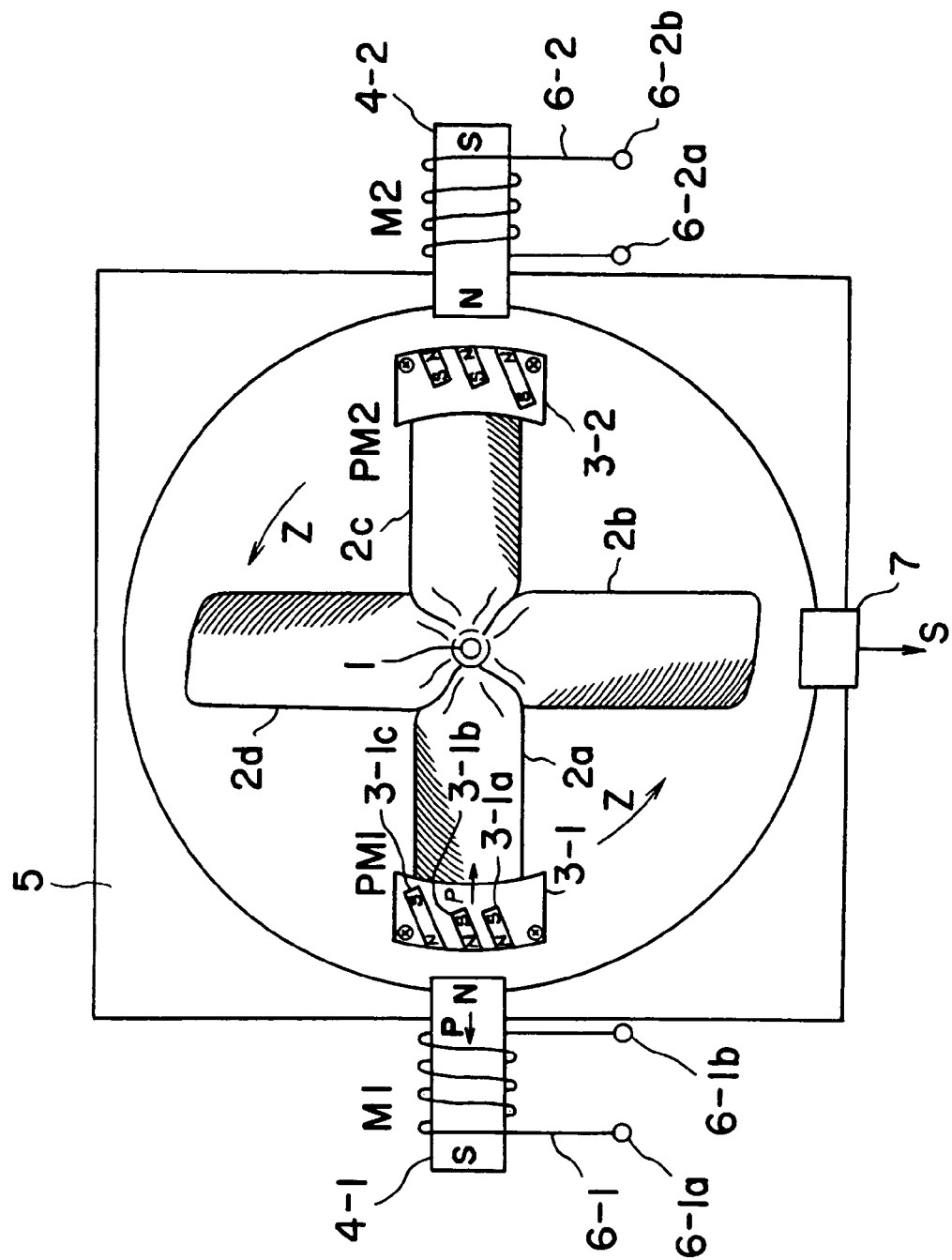
FIG. 7 is a structural diagram of a direct-driven magnetic rotating apparatus according to the present invention, which is applied to a fan without a ring-shaped frame.

In the embodiments of FIG. 3 and FIG. 6, the rotational body 2 is reinforced by joining the outer peripheries of the blades 2a, 2b, 2c, and 2d that construct a propeller one another with a ring-shaped frame. However, it is to be understood that the present invention can also be applied to a fan including a rotational body constructed such that the ring-shaped frame is not provided and the blades 2a, 2b, 2c, and 2d are separated from one another, as shown in FIG. 7, which offers the advantages of the invention equally.

Figure 8:
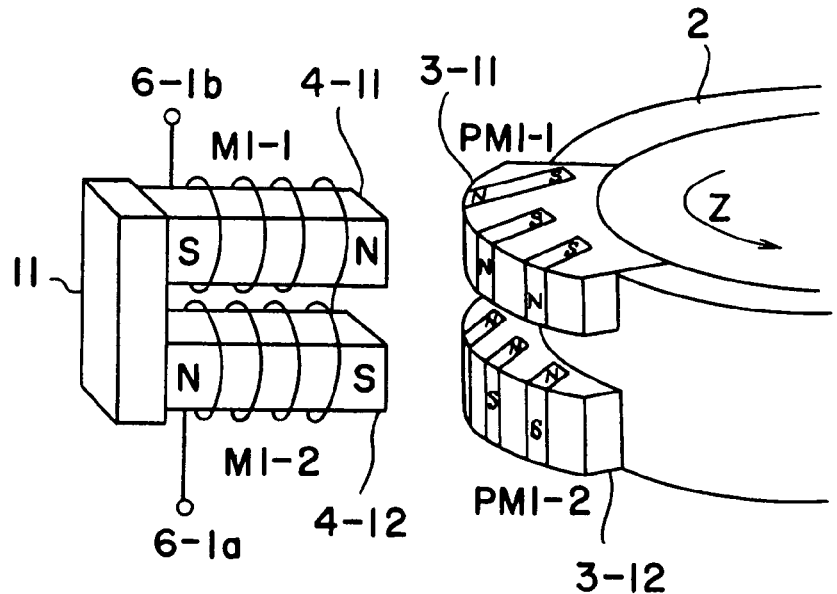
FIG. 8 is a diagram of a direct-driven magnetic rotating apparatus using two electromagnets connected with a metallic member to confine generated magnetic flux.

Referring to FIG. 8, a direct-driven magnetic rotating apparatus will be described which is constructed to make the most of magnetic flux generated by an electromagnet, thereby outputting a larger rotating torque than that of the direct-driven magnetic rotating apparatus shown in FIG. 3. Although electromagnets shown in FIGS. 1 and 3 generate magnetic flux toward the rotational body and in the direction opposite to that, the magnetic flux generating toward the rotational body is used as a repulsive force P, i.e. a rotating force P1, while the magnetic flux generating in the opposite direction is not used at all.

Accordingly, as shown in FIG. 8, two electromagnets 4-11 and 4-12 are combined, of which opposite polarities are bonded together with a metallic body. In the example of FIG. 8, when the south pole of the electromagnet 4-11 and the north pole of the electromagnet 4-12 are magnetically connected with a permeable body (yoke), generally a metallic body 11 such as iron, magnetic flux does not diverge into the air but is enclosed in the metallic body 11, and so the magnetic flux can be used as repulsive force without loss. Thus, high rotating torque can be generated more efficiently.

Figure 9:
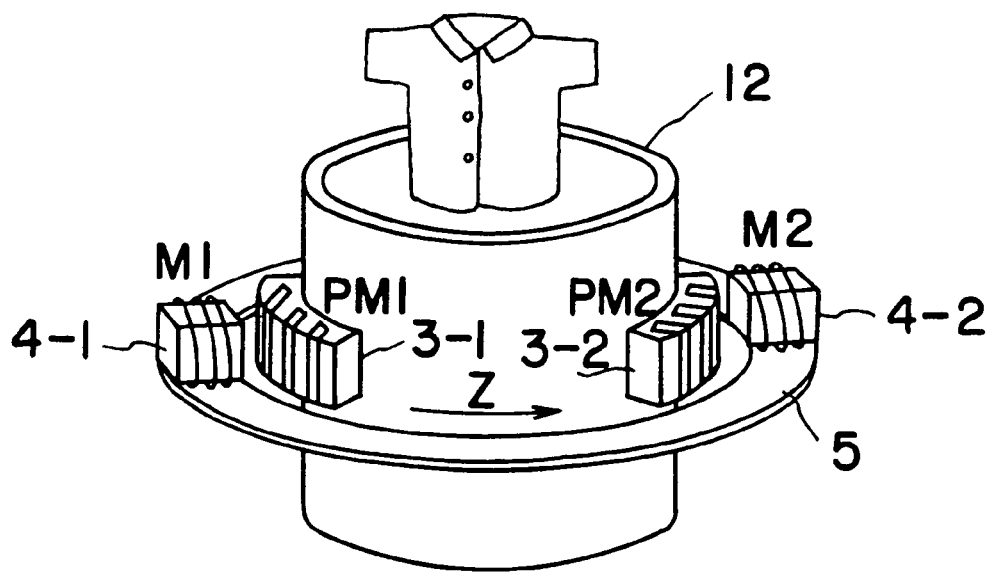
FIG. 9 is a structural diagram of a direct-driven magnetic rotating apparatus applied to a washing machine.

FIG. 9 shows an embodiment of a direct-driven magnetic rotating apparatus in which a rotational body is constructed of a drum 12 of a washing machine or dryer machine in place of the fan described above. Conventional washing machines and dryer machines have drums and motors separated from each other, wherein the rotating force of the motors is transmitted to a drum using shafts etc. Therefore, rotating force is lost at the shafts for transmitting the rotating force, thus decreasing efficiency, as described above. Also, this results in upsizing of the apparatuses because of joints such as shafts, increasing the cost of apparatuses, or damage to the shafts.

However, since the washing machine and dryer machine incorporating the direct-driven magnetic rotating apparatus, shown in FIG. 9, have permanent magnets directly mounted to a drum serving as a rotational body, the drum itself being rotated directly, thus eliminating a loss in a rotating-force transmitting portion to obtain a high efficiency. Also, since there is no need to have a rotating-force transmitting component, a direct-driven magnetic rotating apparatus can be provided that can achieve a compact low-cost washing machine and dryer machine with little trouble.

Figure 10:
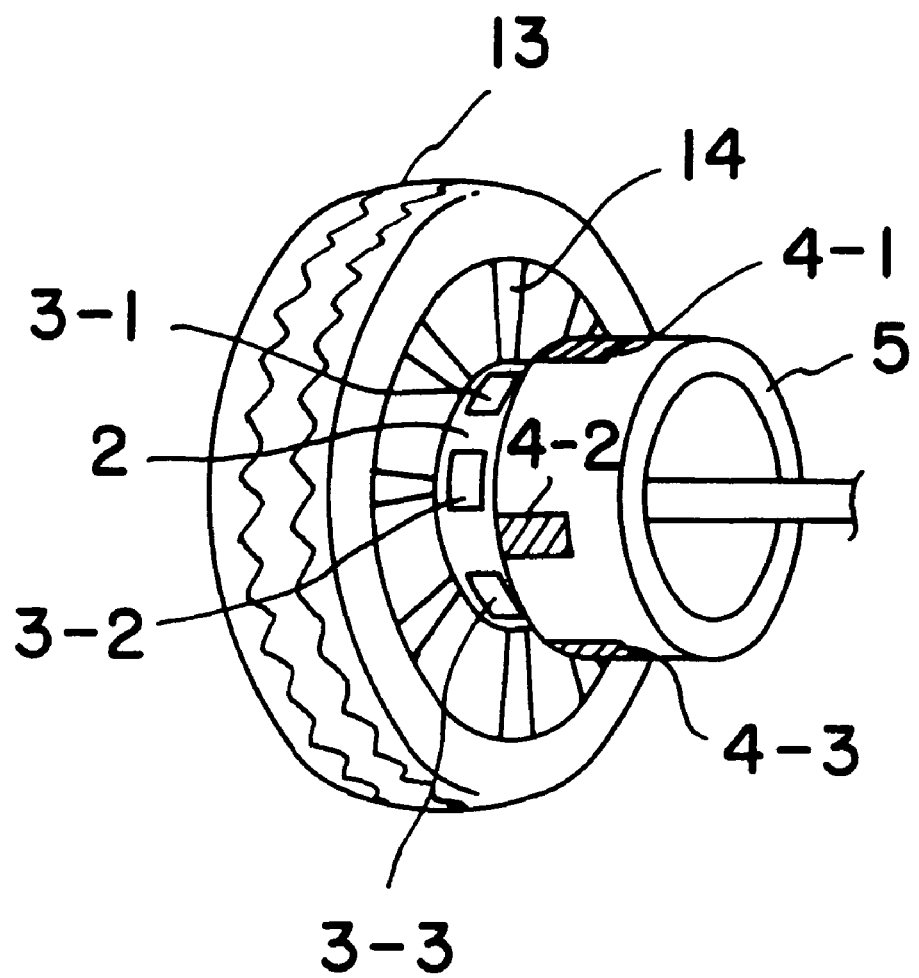
FIG. 10 is a structural diagram of a direct-driven magnetic rotating apparatus applied to an electric automobile.

FIG. 10 shows an embodiment in which the direct-driven magnetic rotating apparatus of the invention is applied to the wheel of an electric automobile. The direct-driven magnetic rotating apparatus of the invention may be applied to all the four wheels, only two front wheels, or only two rear wheels of a four-wheel car. While FIG. 10 shows only one wheel of a four-wheel car, also the other wheels have the same structure. The permanent magnets 3-1, 3-2, and 3-3 are mounted to the rotational body 2, the rotational body 2 is integrated with a fork 14, around the outer periphery of which a tire 13 is mounted. Since the rotational body 2 is mounted directly to the wheel, the transmission efficiency of rotating force is enhanced to improve fuel efficiency and also to decrease the size of the structure because a shaft for transmitting rotating force is not necessary.

Although a fan, an air blower, a washing machine or dryer machine, and an electronic automobile have been described as applications of the direct-driven magnetic rotating apparatus of the present invention, it is to be understood that the direct-driven magnetic rotating apparatus of the invention can be applied to all applications in which motors and rotational bodies are joined with shafts etc.

As described above, the present invention offers the advantage of providing a direct-driven magnetic rotating apparatus applicable to a compact low-cost washing machine or dryer machine with little trouble by mounting permanent magnets directly to a rotational body and providing a direct-driven magnetic rotating apparatus in which a permanent magnet plate having the largest magnetic force is arranged at the last of a permanent magnet, thereby generating rotating force due to strong repulsive force without increasing power consumption of an opposing electromagnet.

The invention claimed is:

1. A direct-driven magnetic rotating apparatus, comprising:
   a rotational shaft;
   a rotational body fixed to the rotational shaft and including a plurality of permanent magnets disposed radially outwards at a prescribed angle around a rim of an outer periphery, wherein each permanent magnet contains a plurality of parallel permanent magnet plates; and
   a plurality of electromagnets disposed in vicinity of the outer periphery of the rotational body so as to be periodically opposed to at least one permanent magnet in the vicinity thereof, wherein the at least one permanent magnet has at least one permanent magnet plate arranged in the last position with respect to a rotating direction with a magnetic force that is larger than a magnetic force of other permanent magnet plates of the at least one permanent magnet so that the permanent magnets are energized by the repulsive force of the electromagnets.

2. The direct-driven magnetic rotating apparatus according to claim 1, wherein the numbers of the permanent magnets and the electromagnets are equal.

3. The direct-driven magnetic rotating apparatus according to claim 1, wherein each electromagnet comprises two magnets, wherein ends of opposite polarities of the two magnets are joined together with a permeable body.

4. The direct-driven magnetic rotating apparatus according to claim 1, further including an electromagnet control circuit which starts application of power to at least one electromagnet to energize the repulsive force against the rotational body when at least one permanent magnet enters a respective position opposed to the at least one electromagnet, and stops the application of power to the at least one electromagnet when the at least one permanent magnet separates from the respective position opposed to the at least one electromagnet.

* * * * *